(12) United States Patent
Binkley

(10) Patent No.: US 7,801,250 B2
(45) Date of Patent: Sep. 21, 2010

(54) LOW LATENCY ANALOG QAM COHERENT DEMODULATION ALGORITHM

(75) Inventor: Michael G. Binkley, Summerfield, NC (US)

(73) Assignee: General Dynamics Advanced Information Systems, Inc., Fairfax, VA (US)

( * ) Notice: Subject to any disclaimer, the term of this patent is extended or adjusted under 35 U.S.C. 154(b) by 1059 days.

(21) Appl. No.: 11/439,310

(22) Filed: May 24, 2006

(65) Prior Publication Data

US 2009/0022245 A1   Jan. 22, 2009

(51) Int. Cl.
*H04L 27/32*   (2006.01)
*H04L 27/38*   (2006.01)

(52) U.S. Cl. ........................ 375/326; 375/340
(58) Field of Classification Search .................. 375/261, 375/340, 316, 324, 326, 327; 329/301, 306, 329/307
See application file for complete search history.

(56) References Cited

U.S. PATENT DOCUMENTS

| | | | |
|---|---|---|---|
| 3,652,938 A | 3/1972 | Byers et al. | |
| 4,166,251 A | 8/1979 | Ishigaki et al. | |
| 4,633,484 A * | 12/1986 | Takeda et al. | 375/321 |
| 5,371,902 A | 12/1994 | Marz | |
| 5,608,764 A | 3/1997 | Sugita et al. | |
| 5,694,389 A | 12/1997 | Seki et al. | |
| 5,757,864 A | 5/1998 | Petranovich et al. | |
| 5,771,224 A | 6/1998 | Seki et al. | |
| 5,912,876 A | 6/1999 | H'mimy | |
| 6,021,110 A | 2/2000 | McGibney | |
| 6,219,334 B1 | 4/2001 | Sato et al. | |
| 6,249,180 B1 | 6/2001 | Maalej et al. | |
| 6,356,598 B1 * | 3/2002 | Wang | 375/321 |
| 6,608,863 B1 | 8/2003 | Onizawa et al. | |
| 6,662,367 B2 | 12/2003 | Dapper et al. | |
| 6,707,863 B1 * | 3/2004 | Mrozek et al. | 375/327 |
| 6,791,995 B1 | 9/2004 | Azenkot et al. | |
| 6,904,098 B1 * | 6/2005 | Isaksen et al. | 375/261 |
| 7,050,419 B2 | 5/2006 | Azenkot et al. | |
| 2002/0199202 A1 | 12/2002 | Hunter | |
| 2004/0042387 A1 | 3/2004 | Geile | |
| 2005/0207334 A1 | 9/2005 | Hadad | |

FOREIGN PATENT DOCUMENTS

| | | |
|---|---|---|
| JP | 10-135924 | 5/1998 |
| WO | WO 99/17511 | 4/1999 |
| WO | WO 01/26317 | 4/2001 |

* cited by examiner

*Primary Examiner*—Tesfaldet Bocure
(74) *Attorney, Agent, or Firm*—Steptoe & Johnson LLP

(57) ABSTRACT

A digital demodulation method for a quadrature amplitude modulated signal uses a phase locked loop to generate a local carrier signal. The phase locked loop uses a feedback signal derived from one or more demodulated signals of interest. The loop has a filter characteristic with a stop band within the information bandwidth(s) of the information signal(s). The preferred method generates an error signal from DC components of in-phase and quadrature-phase baseband signals. DC components are preferably isolated using a low-latency, AC rejection filter.

23 Claims, 3 Drawing Sheets

LOW LATENCY ANALOG QAM COHERENT DEMODULATION ALGORITHM

STATEMENT REGARDING FEDERALLY-SPONSORED RESEARCH OR DEVELOPMENT

The U.S. Government has a paid-up license in the invention and the right in limited circumstances to require the patent owner to license others on reasonable terms as provided for by the terms of contract P-7038 (restricted customer).

BACKGROUND OF THE INVENTION

1. Field of the Invention

The invention is useful in the field of radio-frequency (RF) transmission, and in particular to digital demodulation of quadrature phase amplitude modulated RF signals.

2. Discussion of Background Information

Certain techniques for amplitude modulation and demodulation of a radio frequency carrier are known. FIG. 1 illustrates a demodulation method for an amplitude modulated (AM) signal using digital down converters. An incoming amplitude modulated RF 10 signal is filtered 12 and quantized 14 to form a quantized AM signal 16. The quantized AM signal 16 is downconverted 18 to form an in-phase baseband signal 20 which may be low-pass filtered 22. The quantized AM signal 16 is also downconverted 24 to form a quadrature-phase baseband signal 26 which may be low-pass filtered 28. A phase lock loop (PLL) circuit uses a numerically controlled oscillator (NCO) 34 to generate a local carrier signal 36 that tracks the carrier phase of quantized AM signal 16. The local carrier signal 36 is used to downconvert the quantized AM signal 16 into the in-phase baseband signal 20 using a well-known multiplication relationship. The carrier signal 36 is also phase shifted 38 and used to downconvert the AM signal 16 into the quadrature-phase baseband signal 26 using a well-known multiplication relationship. One baseband signal, such as a quadrature-phase baseband signal 30, is feed directly to a PLL filter 32 for control of the NCO 34. Conventional AM demodulation methods assume that the pass band of the PLL filter is larger than the highest frequency signal of interest.

The demodulation method illustrated in FIG. 1 relies on a well-known algebraic approximation that $\sin(x) \approx x$ for small $x$. In the method of FIG. 1, the NCO would ideally be controlled by the sine of the error between the NCO-generated carrier phase 36 and the carrier phase of the quantized AM signal 16. For simplification, the estimation signal 30 used to control the NCO is the baseband signal. Under this approximation, the quadrature phase baseband signal goes to zero when the detector is ideally locked. Additional background information on phase lock loops AM demodulation can be found in H. Meyr, *Synchronization in Digital Communications & Digital Communications Receivers*, John Wiley & Sons, Inc. New York, 1998.

SUMMARY

In prior AM demodulation methods, the presence of a quadrature data signal can degrade PLL performance. For example, in the demodulation method of FIG. 1, the quadrature-phase baseband signal 26 would contain information for a second data channel. The filtered signal 30 therefore would not go to zero, even when the NCO 34 is ideally locked. The presence of information on the quadrature channel can degrade PLL performance and cause false locks. The novel demodulation method described here can be used to replace prior AM demodulation equipment in high-channel-count digital receiver hardware.

An object of the invention is to provide demodulation of analog QAM signals where both an in-phase and a quadrature-phase are used to transmit acoustic data channels.

A further object of the invention is to decrease channel cross-talk between in-phase and quadrature-phase channels (as compared to conventional digital PLL demodulation).

A further object of the invention is to avoid false locks in the PLL of a QAM demodulator.

A further object of the invention is to provide for demodulation of double-side-band, reduced carrier AM.

A further object of the invention is to provide for AM demodulation with low latency in the phase-locked loop.

These and other objects are achieved by providing a low-latency method for demodulation of QAM signals where both the in-phase and quadrature-phase channels are used for transmission of data channels and it is desirable to have high channel separation (low cross-talk). A signal decomposition process removes some or all of the non-zero frequency signal components prior to phase and frequency estimation. This minimizes PLL degradation due to data on the quadrature-phase channel. A one-pole AC rejection filter in the phase-locked loop reduces latency compared to a baseband, low-pass FIR filter. A signal estimation section uses both the in-phase and quadrature-phase signals for calculating values of phase and frequency error.

Other exemplary embodiments and advantages of the present invention may be ascertained by reviewing the present disclosure and the accompanying drawings.

BRIEF DESCRIPTION OF THE DRAWINGS

The present invention is further described in the detailed description which follows, in reference to the noted plurality of drawings by way of non-limiting examples of certain embodiments of the present invention, in which like numerals represent like elements throughout the several views of the drawings, and wherein.

DETAILED DESCRIPTION OF EXEMPLARY EMBODIMENTS

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Equation 1 describes a QAM signal.

$$s(t) = [A + mx_1]\cos(\omega_c t + \phi_c) + mx_2 \sin(\omega_c t + \phi_c) \quad \text{Equation 1}$$

where:

| |
|---|
| A = Carrier amplitude |
| $\omega_c$ = Carrier Frequency in radians |
| $\phi_c$ = Carrier phase |
| m = Modulation index |
| $x_1$ = Channel 1 signal |
| $x_2$ = Channel 2 signal |

Channel signals $x_1$ and $x_2$ may be acoustic channels of interest where high channel separation (low cross-talk) is desirable.

Figure 1:
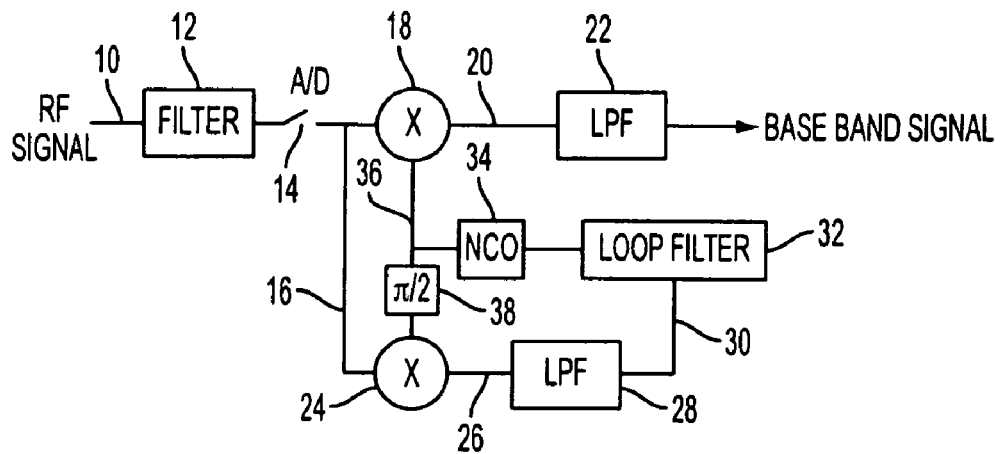
FIG. 1 illustrates a conventional demodulation method for an amplitude modulated (AM) signal using digital downconverters.

One approach to solving the problem of the $x_2$ signal corrupting the phase error estimate would be to modify the FIG. 1 method by making the loop filter 32 a low-pass, Finite Impulse Response (FIR) filter with a cut-off frequency low enough to eliminate the quadrature information signal. This approach does improve channel separation. The amount of improvement is limited because the feed back loop is sensitive to latency. Lowering the cut-off frequency of the low pass filter requires increasing the length of the filter to potentially thousands of taps, which increases latency.

A preferred method described below solves both the problem of latency in the phase-locked loop and the problem of signal content on the quadrature-phase channel. First the in-phase and quadrature-phase baseband signals are decomposed into their zero frequency (DC) and higher frequency (AC) components. Then, the DC signals are used to estimate frequency and phase errors for the PLL. To avoid the problem of introducing latency into the feed back loop, the signal decomposition algorithm is based on a one-pole AC rejection filter. The method may be used on fixed point Digital Signal Processors (DSPs) with noise shaping integrated into the signal decomposition algorithm.

Figure 2:
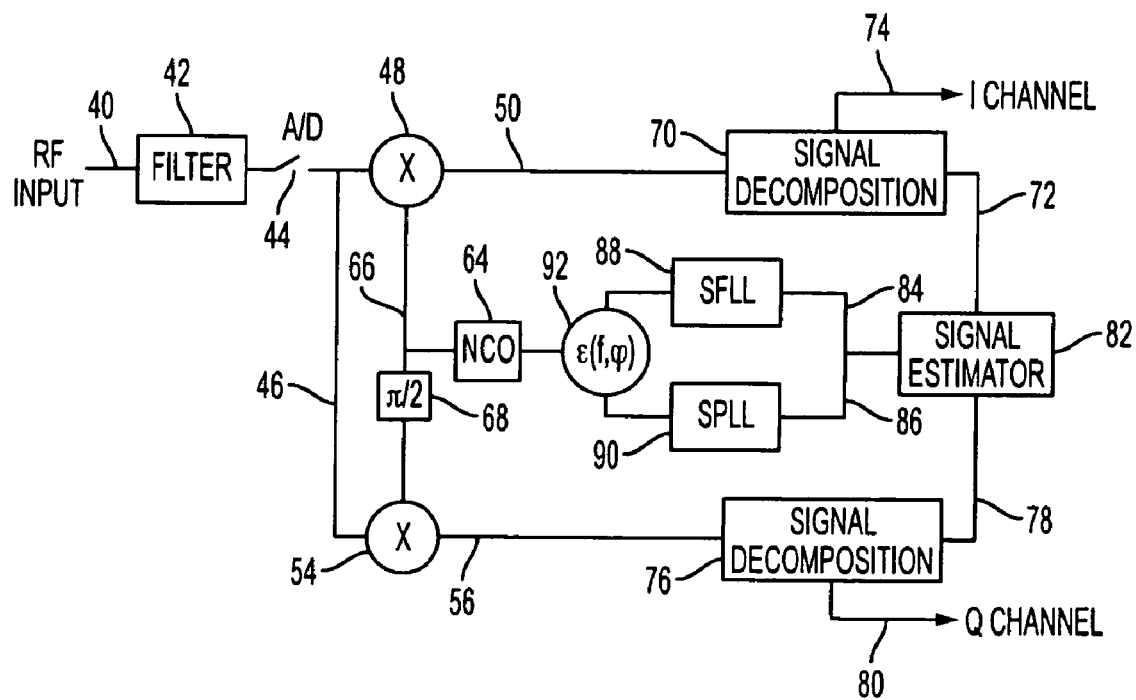
FIG. 2 illustrates a novel demodulation method.

FIG. 2 illustrates the more preferred demodulation method. An incoming amplitude modulated RF signal 40 is filtered 42 and quantized 44 to form a quantized AM signal 46. The quantized AM signal 46 is downconverted 48 to form an in-phase baseband signal 50. The quantized AM signal 46 is also downconverted 54 to form a quadrature-phase baseband signal 56. A phase lock loop (PLL) circuit uses a numerically controlled oscillator (NCO) 64 to generate a local carrier signal 66 that tracks the received carrier. The local carrier signal 66 is used to downconvert the quantized AM signal 46 into the in-phase baseband signal 50. The carrier signal 36 is phase shifted 68 by ninety degrees and used to downconvert the AM signal 46 into the quadrature phase baseband signal 56.

The in-phase baseband signal 50 is decomposed 70 into a DC component 72 and an AC component 74. The quadrature-phase signal 56 is also decomposed 76 into a DC component 78 and AC component 80. The AC components are the in-phase (I) and quadrature-phase (Q) data channels. DC components 72, 78 are used to estimate phase and frequency errors 82 for every sample cycle. The phase error 86 and frequency error 84 are both filtered 88, 90, and one or the other selected 92 for control of the NCO 64. The filtered frequency error may be used during pull-in or acquisition operation when the PLL is attempting to lock to the incoming carrier. The filtered phase error may be used after frequency lock has been achieved. Signal decomposition 70, 76, error estimation 82, and filtering 88, 90 will be discussed in more detail below.

Figure 3:
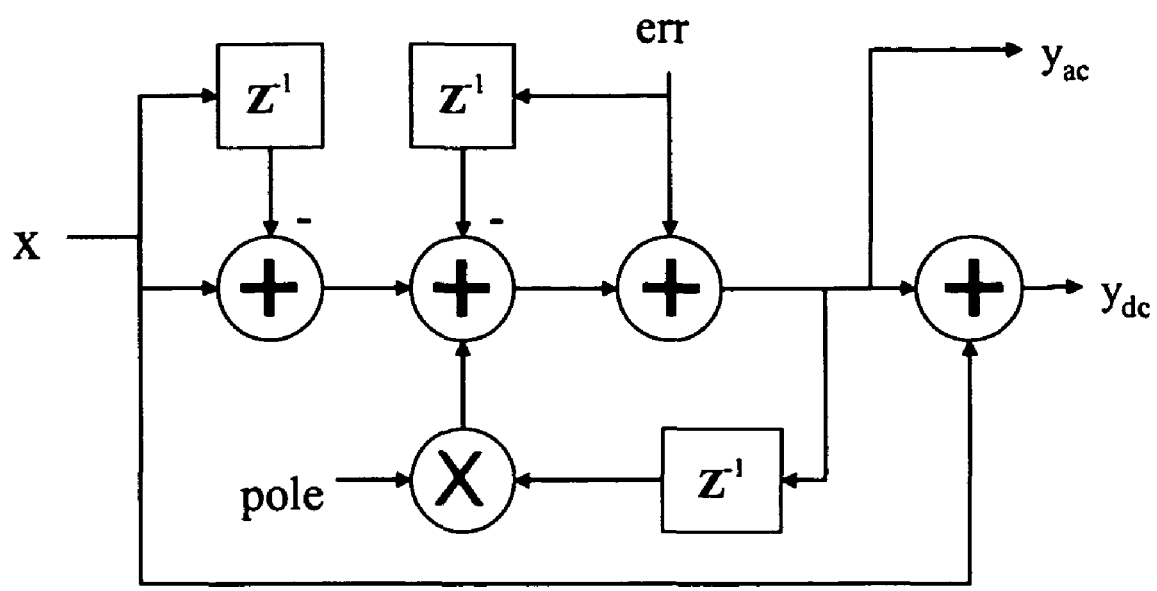
FIG. 3 illustrates signal decomposition.

FIG. 3 illustrates signal decomposition. An input signal X may be an in-phase or quadrature-phase baseband signal 50, 56 as illustrated in FIG. 2. Output signal $y_{yac}$ is the AC component of input signal X. Output signal $y_{dc}$ is the DC component of the input signal X. "+" indicates an addition function. "X" indicates a multiplication function. $Z^{-1}$ is a delay block. Pole indicates a constant used to adjust the dynamic stability (e.g., settling time) of the filter. The output of the third tap is fed back after a delay to the second tap, which provides noise shaping. Such a filter has a latency of less than hundreds or even tens of samples, and in any event less than thousands of samples of a typical FIR filter. The filter transfer function is given by:

$$x1[n]=x[n]-x[n-1]$$

$$y[n]=\text{floor}(\text{pole}*y[n-1]+x1[n]-\text{err}[n-1])$$

$$\text{err}[n]=y[n]-(\text{pole}*y[n-1]+x1[n]-\text{err}[n-1])$$

so:

$$y_{ac}=y[n]$$

$$y_{dc}=y[n]-x[n]$$

Filter cut-off frequency may be adjusted to achieve desired channel separation and other characteristics, such as pull-in time. It is expected the cut-off frequency will be lower than the pass-band of the signal of interest. For acoustic signals of interest, the cut-off frequency could be on the order of tens of hertz or ones of hertz, such as 2 hertz. Cut-off frequency may be described using any known filter characterization methods, such as determining the frequency at which the filter's amplitude response falls 3 decibels (dB).

Figure 4:
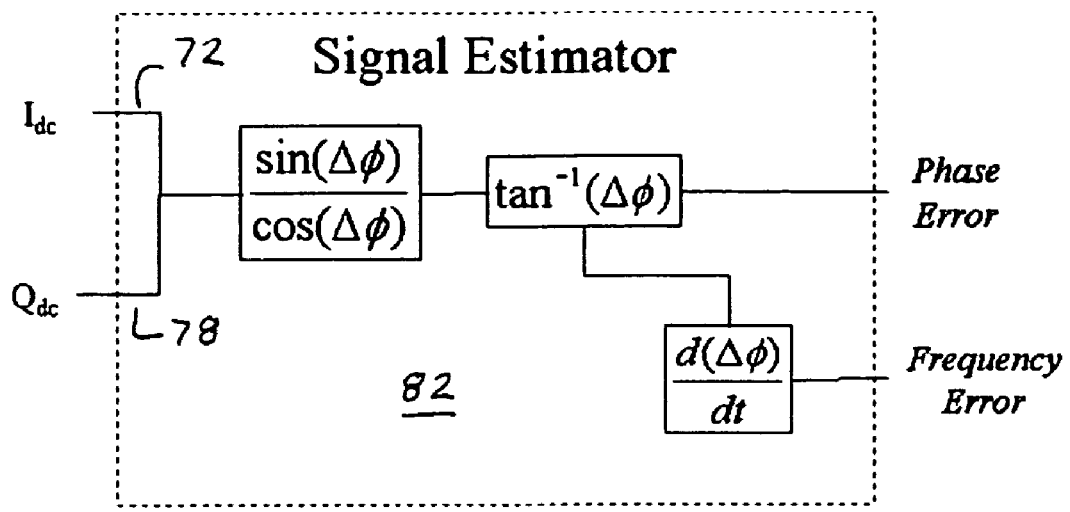
FIG. 4 illustrates signal estimation.

FIG. 4 illustrates signal estimation. I and Q channel DC values of $I_{dc}$ and $Q_{dc}$ for one sample define a point in the complex plane having a phase angle $\phi$ relative to the positive x-axis. The sine and cosine of the phase angle can be calculated from the DC values $I_{dc}$, $Q_{dc}$. The inverse tangent of the sine/cosine ratio is the phase angle $\phi$. A change in phase angle from one sample to another sample $\Delta\phi$ can be computed from sequential values of phase angle $\phi$. A time derivative $d\Delta\phi/dt$ of the change in phase angle $\Delta\phi$ can be calculated using numerical differentiation. The phase error and frequency error are given by the equations:

Frequency Error=$d(\Delta\phi)/dt$.

Phase Error=$\tan^{-1}(\Delta\phi)[\sin(\Delta\phi)/\cos(\Delta\phi)]$.

Figure 5:
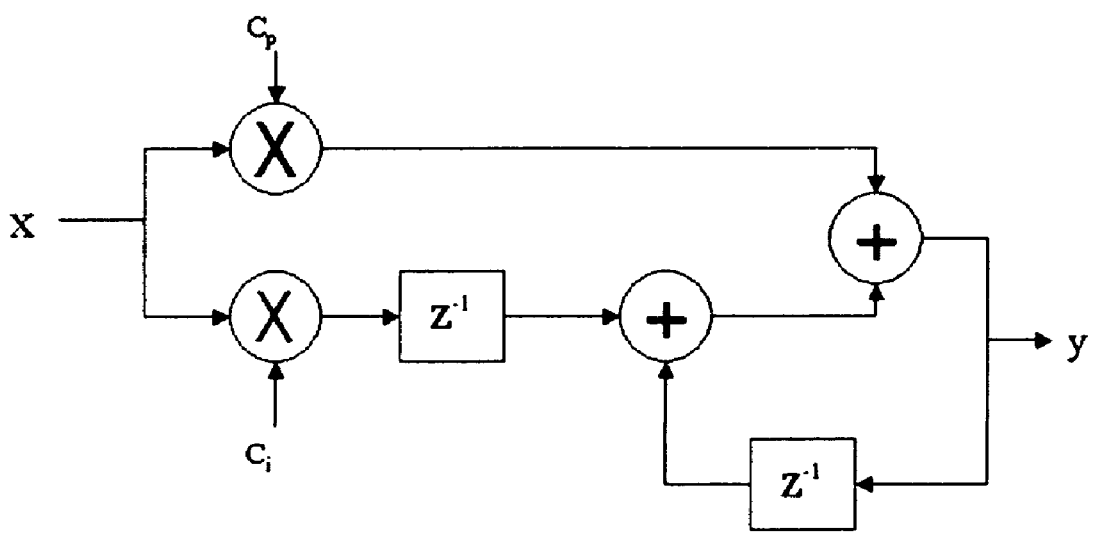
FIG. 5 illustrates a filter.

FIG. 5 illustrates a loop filter. Symbology is the same as for FIG. 3. An input signal x may be the frequency error 84 or phase error 86 from signal estimation 82 (FIG. 2). An output signal y is a filtered version of the input signal x. $C_i$ and $C_p$ are filter coefficients. The transfer function is given by the equation:

$$y[n] = C_p x[n] + C_i x[n-1] + y[n-1]$$

$$C_p = \frac{T_s}{2\tau_1}\left[1 + \frac{1}{\tan\left(\frac{T_s}{2\tau_2}\right)}\right]$$

$$C_i = \frac{T_s}{2\tau_1}\left[1 - \frac{1}{\tan\left(\frac{T_s}{2\tau_2}\right)}\right]$$

where:

$$\tau_1 = \frac{k_0 k_d}{\omega_n^2}$$

-continued $$\tau_2 = \frac{2\zeta}{\omega_n}$$

The same filter structure may be used for both the phase and frequency loop filters. Coefficients may be individually optimized to achieve desired pull-in and lock time responses. The gain constant $k_o k_d$ may be set with $\zeta$ equal to 0.707 to give a one second settling time.

Signal decomposition 70,76, signal estimation 82, and error filtering 88,90 can all be implemented on a single DSP chip, such as a 300 MHz TI 6203 with DSP bios. In fact, multiple instances of these processes may be implemented on a single DSP chip. Where more than two channels of data require transmission, multiple demodulators may be implemented. Multiple demodulator instances may be synchronized by inserting a pilot signal, such as the carrier, into a QAM channel and further adjusting NCO's of different demodulators until pilot tones from all demodulators are synchronized. Multi-channel synchronization is sometimes called coherent demodulation.

The embodiments disclosed above downconverted information channels to baseband and derived an error signal from DC components of the baseband signals. It should be appreciated that the information channels could be downconverted to intermediate frequencies, and that a variety of filter characteristics may be used having stop bands within the information bands of the channels used to derive the error signal.

It is noted that the foregoing examples have been provided merely for the purpose of explanation and are in no way to be construed as limiting of the present invention. While the present invention has been described with reference to certain embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims

What is claimed is:

1. A digital demodulation method for a QAM signal carrying an information signal of interest comprising:
   downconverting the information signal of interest from the QAM signal using a local carrier signal; and
   using a phase-locked loop to generate the local carrier signal in response to a feedback signal derived from the downconverted signal of interest, said phase-locked loop having a filter characteristic with a stop band within the information bandwidth of the information signal of interest;
   wherein the step of using a phase-locked loop comprises a step of estimating a phase error between the QAM carrier and the local carrier using a DC component of the demodulated signal of interest.

2. A digital demodulation method for a QAM signal carrying an information signal of interest comprising:
   downconverting the information signal of interest from the QAM signal using a local carrier signal; and
   using a phase-locked loop to generate the local carrier signal in response to a feedback signal derived from the downconverted signal of interest, said phase-locked loop having a filter characteristic with a stop band within the information bandwidth of the information signal of interest;
   wherein the filter characteristic has a pass band between zero hertz and tens of hertz in the information signal bandwidth.

3. A digital demodulation method for a QAM signal carrying an information signal of interest comprising:
   downconverting the information signal of interest from the QAM signal using a local carrier signal; and
   using a phase-locked loop to generate the local carrier signal in response to a feedback signal derived from the downconverted signal of interest, said phase-locked loop having a filter characteristic with a stop band within the information bandwidth of the information signal of interest;
   wherein the filter characteristic has a band pass with a cut-off between zero hertz and ones of hertz in the information signal bandwidth.

4. A digital demodulation method for a QAM signal carrying an information signal of interest comprising: downconverting the information signal of interest from the QAM signal using a local carrier signal; and
   using a phase-locked loop to generate the local carrier signal in response to a feedback signal derived from the downconverted signal of interest, said phase-locked loop having a filter characteristic with a stop band within the information bandwidth of the information signal of interest;
   wherein the filter characteristic has a pass band with a cut-off between zero hertz and two hertz in the information signal bandwidth.

5. A digital demodulation method for a QAM signal carrying an information signal of interest comprising: downconverting the information signal of interest from the QAM signal using a local carrier signal; and
   using a phase-locked loop to generate the local carrier signal in response to a feedback signal derived from the downconverted signal of interest, said phase-locked loop having a filter characteristic with a stop band within the information bandwidth of the information signal of interest;
   wherein the phase-locked loop includes an AC rejection filter having a stop band within the information bandwidth of the information signal of interest.

6. A digital demodulation method for a QAM signal carrying an information signal of interest comprising:
   downconverting the information signal of interest from the QAM signal using a local carrier signal; and
   using a phase-locked loop to generate the local carrier signal in response to a feedback signal derived from the downconverted signal of interest, said phase-locked loop having a filter characteristic with a stop band within the information bandwidth of the information signal of interest;
   wherein the filter characteristic is implemented with a latency of less than thousands of samples.

7. A digital demodulation method for a QAM signal carrying an information signal of interest comprising:
   downconverting the information signal of interest from the QAM signal using a local carrier signal; and
   using a phase-locked loop to generate the local carrier signal in response to a feedback signal derived from the downconverted signal of interest, said phase-locked loop having a filter characteristic with a stop band within the information bandwidth of the information signal of interest;

wherein the filter characteristic is implemented with a latency of less than hundreds of samples.

8. A digital demodulation method for a QAM signal carrying an information signal of interest comprising:

downconverting the information signal of interest from the QAM signal using a local carrier signal; and using a phase-locked loop to generate the local carrier signal in response to a feedback signal derived from the downconverted signal of interest, said phase-locked loop having a filter characteristic with a stop band within the information bandwidth of the information signal of interest;

wherein the filter characteristic is implemented with a latency of less than tens of samples.

9. A digital method of demodulating a QAM signal having first and second information signals modulated on in-phase and quadrature phase channels of a carrier, the method comprising:

forming a first information signal by downconverting the QAM signal using a first locally-generated carrier signal;

forming a second information signal by downconverting the QAM signal using a second locally-generated carrier signal that is out of phase with first locally-generated carrier signal;

isolating DC components of the first and second downconverted signals, said DC components excluding at least some frequency components in the information bandwidths of the information signals;

deriving an error signal from the isolated DC components; and adjusting a phase of a locally-generated carrier signal according to the error signal.

10. The method of claim 9 wherein the step of isolating DC components includes a step of excluding frequency components above tens of hertz in an information signal bandwidth.

11. The method of claim 9 wherein the step of isolating DC components includes a step of excluding frequency components above ones of hertz in an information signal bandwidth.

12. The method of claim 9 wherein the step of isolating DC components includes a step of excluding frequency components above two hertz in an information signal bandwidth.

13. The method of claim 9 wherein the step of isolating DC components is implemented with a latency of less than thousands of samples.

14. The method of claim 9 wherein the step of isolating DC components is implemented with a latency of less than hundreds of samples.

15. The method of claim 9 wherein the step of isolating DC components is implemented with a latency of less than tens of samples.

16. The method of claim 9 wherein the step of isolating DC components is implemented with an AC rejection filter.

17. A demodulator for a digitized QAM signal carrying first and second information signals, the demodulator comprising:

a first downconverter generating a first downconverted information signal in response to the QAM signal and a local carrier signal of a first phase;

a second downconverter generating a second downconverted information signal in response to the QAM signal and a local carrier signal of a second phase and;

an oscillator generating the local carrier signal in response to an error signal;

wherein the error signal is derived from components of the first and second downconverted information signals, said components including DC components but attenuating AC components in the information signal information bandwidths.

18. The demodulator of claim 17 wherein the error signal is derived by isolating DC components from AC components using an AC rejection filter.

19. The demodulator of claim 17 wherein the error signal is derived by isolating DC components from AC components at a cutoff above tens of hertz in the information signal bandwidth.

20. The demodulator of claim 17 wherein the error signal is derived by isolating DC components from AC components at a cutoff above ones of hertz in the information signal bandwidth.

21. The demodulator of claim 17 wherein the error signal is derived by isolating DC components from AC components at a cutoff above two hertz in the information signal bandwidth.

22. The demodulator of claim 17 wherein the DC components are derived from the downconverted information signals with a latency of less than thousands of samples.

23. The demodulator of claim 17 wherein the DC components are derived from the downconverted information signals with a latency of less than tens of samples.

* * * * *